Patented Sept. 2, 1952

2,609,393

UNITED STATES PATENT OFFICE 2,609,393

DODECYL, DIMETHYL,-CINNAMYL-AMMONIUM HALIDES

Frank S. Crossley, Collingdale, Pa., assignor to Sharp & Dohme, Incorporated, Philadelphia, Pa., a corporation of Maryland No Drawing. Application February 2, 1951, Serial No. 209,203

4 Claims. (Cl. 260—567.6)

This invention relates to antiseptic and germicidal compounds, and more particularly to a quaternary ammonium compound having these properties, and having the general formula:

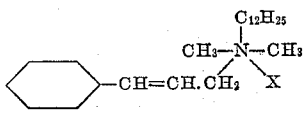

in which X is chlorine, iodine or bromine.

A feature of the invention resides in the discovery that the presence of the cinnamyl radical and the normal dodecyl radical in the compound unexpectedly enhances its bactericidal action.

Aqueous solutions of this compound are valuable as antiseptics and germicides. For example, they may be used as mouth washes and for topical application. Due to the unusually high activity of the compound, very dilute aqueous solutions may be used and they possess the consequent distinct advantage of lacking a strong taste or odor.

The compound of the invention may be made by starting with the readily obtainable primary dodecyl amine. This primary amine is converted to the corresponding tertiary amine by dimethylation with formic acid and formaldehyde according to known methods. One such method involves the addition of one mol of the selected amine dropwise to about 5 mols of formic acid (90%) to obtain the formate of the primary amine and then adding rapidly, during about a minute, about 2.2 mols of formaldehyde (36%). This should all take place with the reaction flask immersed in a cool water bath while the mixture is stirred continuously. The mixture is allowed to react without heating for an additional fifteen minutes, then cautiously warmed until a vigorous reaction commences as is evidenced by considerable foaming due to the evolution of carbon dioxide. The reaction is thereafter controlled to maintain gentle refluxing conditions by the application of heat or a cool water bath, as required. The vigorous reaction subsides in about fifteen minutes but the stirring should be continued and the flask should be heated on a steam bath for about an additional seven hours.

The tertiary amine is then isolated by conventional methods as follows: The mixture is diluted with water and made strongly alkaline with an excess of sodium or ammonium hydroxide solutions. The oil that separates is dissolved in benzene. The benzene solution is thoroughly washed with water and then benzene is removed by distillation. The tertiary amine is separated from the residue by fractional distillation in vacuum.

The tertiary amine is then quaternized by allowing it to react, preferably at room temperature, with an equimolecular amount of a cinnamyl halide until the resulting solid is completely soluble in water. The quaternary ammonium salt is then purified by crystallization from an appropriate solvent or solvent mixture.

The compound was subjected to the United States Food and Drug Administration method of testing antiseptics and disinfectants, essentially as described at pages 2 through the middle of page 10 of the United States Department of Agriculture Circular No. 198 dated December 1931. The culture used was Staphylococcus aureus F. D. A. No. 209-A. The effective aqueous dilution represents the greatest dilution of one gram of the specific compound capable of killing the organism in ten minutes, but incapable of killing it in five minutes. This follows the explanation contained between the two tables on page 8 of the circular No. 198. Tests are made at 37° C.

EXAMPLE 1

*Dodecyl-dimethyl-cinnamyl-ammonium chloride*

Dodecyl-dimethylamine (32 grams, 0.15 mole) and cinnamyl chloride (22.8 grams, 0.15 mole) were dissolved in absolute ethyl acetate (150 ml.). The mixture was allowed to react at room temperature. After standing over night, the solution had deposited a mass of colorless crystals. The mixture was filtered and the crystalline product recrystallized from absolute ethyl acetate. This product, dodecyl-dimethyl-cinnamyl-ammonium chloride

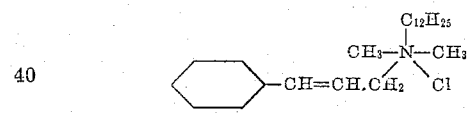

melted at 119–120° C. (uncorrected).

EXAMPLE 2

*Dodecyl-dimethyl-cinnamyl-ammonium iodide*

This compound is prepared as in Example 1, using an equivalent amount of cinnamyliodide in place of cinnamyl chloride.

EXAMPLE 3

*Dodecyl-dimethyl-cinnamyl-ammonium bromide*

This compound is prepared as in Example 1, using an equivalent amount of cinnamyl bromide in place of cinnamyl chloride.

To obtain the compound of the invention it is not necessary to utilize pure dodecyl-dimethyl amine to be quaternized. It is possible to employ a mixture of tertiary amines in which the dodecyl-dimethyl amine is present and to treat this mixture according to one of the examples. Thus, the mixture of tertiary amines that may be derived from cocoanut oil. Of the alkyl radicals (the so-called lorol compounds) derived from cocoanut oil, the dodecyl radical is predominately present.

Therefore, by converting this mixture of varying chain length aliphatic fatty acids of cocoanut oil to the corresponding primary amines in known manner, then to the tertiary amines and finally to the quaternary ammonium compounds, a mixture is obtained which predominately contains the dodecyl - dimethyl - cinnamyl - ammonium compound of the invention. This has the advantage of being much less costly than starting with the considerably more expensive, relatively pure dodecyl-dimethyl amine.

A commercial mixture of tertiary amines which may be used to carry out the invention is sold under the name "Cocodimethylamine." They are tertiary amines having two methyl groups attached to the nitrogen and also having a long chain alkyl group, the predominant one of which is dodecyl, attached to the nitrogen.

When the chloride compound of the invention is tested by the method above outlined, it has an effective aqueous dilution of 1:195,000. When dodecyl-dimethyl-benzyl-ammonium chloride is tested in like manner it has an effective aqueous dilution of only 1:35,000. Similarly when the cinnamyl quaternary salt of the above described mixture of tertiary amines derived from cocoanut oil is tested in like manner it has an effective aqueous dilution of 1:205,000, while the benzyl quaternary salts of the same tertiary amine mixture has an effective aqueous dilution of only 1:80,000. The unexpected superiority of the invention is manifest.

What is claimed is:

1. Dodecyl dimethyl cinnamyl ammonium halides, the halide being selected from the group consisting of chloride, bromide and iodide.
2. Dodecyl dimethyl cinnamyl ammonium chloride.
3. Dodecyl dimethyl cinnamyl ammonium bromide.
4. Dodecyl dimethyl cinnamyl ammonium iodide.

FRANK S. CROSSLEY.

REFERENCES CITED

The following references are of record in the file of this patent:

UNITED STATES PATENTS

| Number | Name | Date |
| --- | --- | --- |
| 2,108,765 | Domagk | Feb. 15, 1938 |

OTHER REFERENCES

Chem. Abst., vol. 36 (1942), p. 6662.